United States Patent

Bayer et al.

[11] Patent Number: 5,886,095
[45] Date of Patent: Mar. 23, 1999

[54] PROCESS FOR THE PREPARATION OF RETENTION AND DEWATERING AGENTS BASED ON POLYAMINO-ETHERS

[75] Inventors: Roland Bayer, Fallingbostel; Wolfgang Koch, Bomlitz; Klaus Szablikowski, Walsrode, all of Germany

[73] Assignee: Wolff Walsrode AG, Waldsrode, Germany

[21] Appl. No.: 865,168

[22] Filed: May 29, 1997

[30] Foreign Application Priority Data

May 30, 1996 [DE] Germany .................. 196 216 97.4

[51] Int. Cl.$^6$ ........................ C08G 63/48; C08G 12/00
[52] U.S. Cl. .................... 525/66; 525/68; 528/229
[58] Field of Search .......................... 564/508; 558/447; 210/735; 525/66, 68; 528/229

[56] References Cited

U.S. PATENT DOCUMENTS

| | | | |
|---|---|---|---|
| 3,753,931 | 8/1973 | Raspanti et al. | 260/2 BP |
| 4,267,059 | 5/1981 | Behn et al. | 210/736 |
| 5,371,119 | 12/1994 | Bohlander et al. | 523/414 |

FOREIGN PATENT DOCUMENTS

714 B1  3/1982  European Pat. Off. ........ C08G 69/48

OTHER PUBLICATIONS

Chemical Abstracts No. 94: 49088q for DE 2,916,356, (Nov. 13, 1980).

Translation of the main content of German Offenlegungsschrift No. 2162567 which was filed by Sandoz AG on Dec. 16, 1971, and was published on Jul. 20, 1972: Process for the production of cationic, water–soluble, thernosetting, highly branched resins, pp. 1–10.

*Primary Examiner*—S. Mark Clardy
*Assistant Examiner*—Alton Pryor
*Attorney, Agent, or Firm*—Sprung Kramer Schaefer & Briscoe

[57] ABSTRACT

The present invention relates to a process for the preparation of branched and/or crosslinked polyamino-ethers in which polyamino-ethers, which are prepared from glycol dichlorohydrins or polyglycol dichlorohydrins and diamines and still contain free chlorohydrin groups, are crosslinked in an essentially aqueous solution under alkaline conditions under the influence of heat.

7 Claims, No Drawings

PROCESS FOR THE PREPARATION OF RETENTION AND DEWATERING AGENTS BASED ON POLYAMINO-ETHERS

The present invention relates to a process for the preparation of a crosslinked polymeric product which is formed by heat treatment of chlorohydrin-containing polyamino-ethers under alkaline conditions. The resulting product is suitable as a paper auxiliary, in particular as a retention and dewatering agent.

The preparation of polyamino-ethers from polyethylene glycol or other glycols by reaction with two equivalents of epichlorohydrin under catalytic conditions, for example by $BF_3$ catalysis, is known, cf. European Patent Specification 0 000 714, Example 1a, component product A; German Offenlegungsschrift 21 62 567. In the reaction between glycol or polyethylene glycol and two equivalents of epichlorohydrin, a (poly)ethylene glycol dichlorohydrin ether is initially formed, and is subsequently reacted with a diamine with the addition of water. A polyadduct is formed by nucleophilic substitution by this procedure. Because of its cationic charges, this polyadduct is in principle capable of being employed as a retention and dewatering agent in papermaking or in the working up of waste waters and sewage sludges. In practice, however, it is found that the polyamino-ethers thus obtained show very poor retention and dewatering performances. One of the reasons for this is that the resulting products in general have molecular weights which are too low.

The object of the present invention was therefore the development of a retention and dewatering agent based on polyamino-ethers which shows considerably better retention and dewatering values than the systems known according to the prior art.

The invention therefore relates to a process for the preparation of branched and/or crosslinked polyamino-ethers, which comprises crosslinking polyamino-ethers, which are prepared from glycol dichlorohydrins or polyglycol dichlorohydrins and diamines and still contain free chlorohydrin groups, in an essentially aqueous solution under alkaline conditions under the influence of heat.

Polyamino-ethers which are prepared in this manner show a significantly higher dewatering performance than those prepared according to the prior art.

For carrying out the process according to the invention of alkaline crosslinking of polyamino-ethers, the procedure is in general as follows: the preparation of the polyamino-ethers is modified such that the resulting product still contains sufficient free chlorohydrin groups which can be used for crosslinking under alkaline conditions under the influence of heat. This requires a stoichiometric deficit of primary amino groups compared with the chlorohydrin or epoxide groups at the chain ends. Molar ratios of chlorohydrin/epoxide groups to primary amino groups of 1:0.999 to 1:0.7, in particular 1:0.999 to 1:0.8, are suitable. Suitable amines are all the α,β-diprimary amines, in particular ethylenediamine, diethylenetriamine, triethylenetetramine, tetraethylenepentamine, higher ethylenepolyamines, propylenediamine, dipropylenetriamine, tripropylenetriamine, higher propylenepolyamines, piperazines, copolymers, graft copolymers and block copolymers comprising polyvinylamine and vinylamine, polyallylamine and copolymers, graft copolymers and block copolymers comprising allylamine, polyethyleneimine and copolymers, graft copolymers and block copolymers comprising polyethyleneimine and ethyleneimine or mixtures of the cited substances.

The crosslinking according to the invention is in general carried out by initially introducing the chlorohydrin-containing polyamino-ether into the reaction vessel in a solution in a concentration of 5–50%, in particular 10–25%. The solution is then heated to the abovementioned temperature and brought to the abovementioned pH with a base, in particular KOH or NaOH. It is also possible first to render the solution alkaline and then to carry out the crosslinking by heating. The base can be added as an aqueous or alcoholic solution or in solid form, but the aqueous solution is preferred.

Suitable solvents for carrying out the crosslinking are all aqueous-organic solvent systems which comprise one or more of the following solvents: water, alcohols, ketones, ethers, esters and amides, water, $C_1$–$C_4$-alcohols, $C_1$–$C_4$-ketones and $C_1$–$C_4$-amides are preferred, and water is especially preferred. Conditions (in aqueous solution) of pH 8–13, in particular pH 9–11, and temperatures between 50° and 150° C., in particular 60°–90° C., are suitable for the crosslinking.

The alkaline heat treatment of the solution is associated with an increase in viscosity. When the solution has reached the desired viscosity, it can be brought to the desired pH with acid, in particular formic acid or acetic acid. This is necessary, above all, if chlorohydrin groups are still in solution. The resulting end product in general has a viscosity of a flow time of 15–100 seconds in a 4 mm flow cup (in accordance with DIN 53211). The product prepared is suitable, inter alia, as a retention and dewatering agent, cationic fixing agent, wet-strength agent and as a flocculating agent. The process according to the invention leads to a product which has a significantly improved dewatering performance compared with the untreated starting sample.

EXAMPLES

Example 1
Preparation of polyamino-ethers 390.0 g of polyethylene glycol 400 and 1.3 g of boron trifluoride dihydrate are initially introduced into a 1 l three-necked flask with a stirrer, thermometer and dropping funnel. After heating up to 64° C., dropwise addition of 180.1 g of 98% strength epichlorohydrin in the course of 90–120 minutes is started, while stirring.

During this procedure, the temperature of the exothermic reaction is kept between 65° and 70° C. When the dropwise addition has ended, the mixture is subsequently stirred for a further hour. 85.1 g of diethylenetriamine are then added dropwise over a period of 60 minutes, the temperature being maintained. The dioxane formed in a side reaction is distilled off over a column. After 369.71 g of dioxane-containing water has been distilled off, a solution with a concentration of 63.2% is obtained.

Example 2

The reaction is carried out as in Example 1. Instead of 85.1 g of diethylenetriamine, 270.6 g of polyamine C (Bayer AG, Leverkusen) are added. The subsequent procedure is as described under Example 1.

Example 3
Crosslinking of polyamino-ethers 602.56 g of a 75% strength polyamino-ether according to Example 1 and 2192.5 g of distilled water are initially introduced into a 2 l reaction vessel with a ground glass lid, heating jacket, stirrer, thermometer, reflux condenser and pH probe. After heating up to 70° C., 57.42 g of 50% strength NaOH solution are added in the course of about 90 seconds, while stirring. During further stirring, the viscosity increases until a maximum value is reached, after about 4 hours. The reaction is then brought to pH 7.0 with 85% strength formic acid and cooled. A product having a solids content of 16.1% and a flow time (4 mm DIN 53211 cup) of 85 seconds is obtained.

Dewatering experiments with the Schopper-Riegler freeness tester

The following table shows the dewatering improvement achieved when amounts of 0.1, 0.2 and 0.3% of dewatering agent are employed. The concentration data of 0.1/0.2/0.3 here mean: 1/2/3 ml of a dewatering agent solution per kg of paper pulp, the dewatering agent solution comprising 0.2 g of solid dewatering agent as a solution, for example 1 g of a 20% strength solution of dewatering agent diluted with water to 500 ml of solution. Paper system, recycled paper, Walsroder Zeitung, tapwater (30° C.), amount employed: 60 g of a 5% strength paper pulp diluted with water to 1000 g.

| Probe | Dewatering improvement using a concentration of | | |
|---|---|---|---|
| | 0.1% | 0.2% | 0.3% |
| Polyamino-ether according to Example 1 (= prior art) | 5% | 10% | 14% |
| Polyamino-ether according to Example 3 and heat treatment for 10 minutes | 13.5% | 22% | 27.5% |
| Polyamino-ether according to Example 3 and heat treatment for 30 minutes | 24.5% | 33.5% | 41% |
| Polyamino-ether according to Example 3 and heat treatment for 60 minutes | 29% | 38% | 46% |
| Polyamino-ether according to Example 3 and heat treatment for 120 minutes | 31% | 42% | 49% |
| Polyamino-ether according to Example 3 and heat treatment for 180 minutes | 32.5% | 46% | 53% |

We claim:

1. A process for the preparation of a branched and/or crosslinked polyamino-ether which comprises crosslinking a polyamino-ether, which has been prepared from a glycol dichlorohydrin or polyglycol dichlorohydrin and a diamine and still contains free chlorohydrin groups, in an essentially aqueous solution under alkaline conditions under the influence of heat and wherein the ratio of chlorohydrin groups to primary amino group in the preparation of the polyamino-ether is 1:0.999 to 1:0.7.

2. The process as claimed in claim 1, wherein ethylene glycol, propylene glycol, a polyethylene glycol or a polypropylene glycol is employed as the glycol.

3. The process as claimed in claim 1, wherein an $\alpha,\beta$-diaminoalkane, in particular ethylenediamine, diethylenetriamine, triethylenetetramine, tetraethylenepentamine, a higher ethylenepolyamine, propylenediamine, dipropylenetriamine, tripropylenetriamine, a higher propylenepolyamine, a piperazine, polyvinylamine, a copolymer, graft copolymer or block copolymer comprising vinylamine, polyallylamine, a copolymer, graft copolymer or block copolymer comprising allylamine, polyethyleneimine or a copolymer, graft copolymer or block copolymer comprising ethyleneimine or mixtures of the cited substances are employed as the diamine.

4. The process as claimed in claim 1, wherein the crosslinking takes place in a solvent which, in addition to water, can also comprise an alcohol, ketone, ether, ester or amide.

5. The process as claimed in claim 1, wherein the crosslinking takes place in water.

6. The process as claimed in claim 1, wherein the concentration of the solution to be crosslinked is 5 to 50%.

7. The use of a product prepared as claimed in claim 1 as a retention and dewatering agent, fixing agent, wet-strength agent or flocculating agent.

* * * * *

UNITED STATES PATENT AND TRADEMARK OFFICE
CERTIFICATE OF CORRECTION

PATENT NO.    : 5,886,095
DATED         : March 23, 1999
INVENTOR(S)   : Roland Bayer, et al.

It is certified that error appears in the above-identified patent and that said Letters Patent is hereby corrected as shown below:

Title Page, Other Publications, Line 6  Delete "thernosetting" and substitute --thermosetting--

Title Page, Foreign Documents  After "69/48" insert
--0000714  2/1979 Europe
  2162567  7/1972 Germany
  2916356  11/1980 Germany
  9201729  2/1992 World Signed and Sealed this Twenty-third Day of May, 2000

Attest:

Q. TODD DICKINSON

*Attesting Officer*      *Director of Patents and Trademarks*